(12) United States Patent
Colantonio et al.

(10) Patent No.: US 6,988,522 B2
(45) Date of Patent: Jan. 24, 2006

(54) SELF-SUPPORTING PNEUMATIC TIRE WITH A PARTIAL INNER LINER

(75) Inventors: Laurent Luigi Domenico Colantonio, Bastogne (BE); Anne Thérèse Peronnet-Paquin, Luxembourg (LU); Filomeno Gennaro Corvasce, Mertzig (LU); Alain Emile Francois Roesgen, Roeser (LU); Frank Philpott, Waldbredimus (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 283 days.

(21) Appl. No.: 10/317,341

(22) Filed: Dec. 12, 2002

(65) Prior Publication Data

US 2004/0112496 A1   Jun. 17, 2004

(51) Int. Cl.
*B60C 5/14* (2006.01)
*B60C 17/00* (2006.01)
(52) U.S. Cl. ................. 152/517; 152/510; 152/DIG. 16
(58) Field of Classification Search ................. 152/510, 152/517, DIG. 16
See application file for complete search history.

(56) References Cited

U.S. PATENT DOCUMENTS

| 2,676,636 | A |   | 4/1954  | Sarbach ..................... 152/230 |
| 4,365,659 | A |   | 12/1982 | Yoshida et al. ......... 152/354 R |
| 4,913,209 | A | * | 4/1990  | Hong et al. ................ 152/504 |
| 5,158,627 | A |   | 10/1992 | Saneto et al. ............... 152/510 |
| 5,368,082 | A |   | 11/1994 | Oare et al. .................. 152/517 |
| 5,851,323 | A | * | 12/1998 | Kaido et al. ................ 152/510 |
| 5,871,600 | A |   | 2/1999  | Oare et al. .................. 152/458 |
| 6,135,181 | A |   | 10/2000 | Paonessa et al. ........... 152/458 |
| 6,453,961 | B1|   | 9/2002  | Colantonio et al. ......... 152/517 |

* cited by examiner

*Primary Examiner*—Geoffrey L. Knable
(74) *Attorney, Agent, or Firm*—Nancy T. Krawczyk

(57) ABSTRACT

A self-supporting pneumatic tire, capable of continued operation during under-inflation conditions, has at least one insert located in each tire sidewall. Forming the interior surface of the self-supporting tire is a stiffening layer of material having characteristics similar to that of the insert. In the tread region of the tire, and radially inward of the innermost carcass layer, and possibly in the interior bead region of the tire, is a partial inner liner layer of the bromobutyl rubber.

8 Claims, 4 Drawing Sheets

SELF-SUPPORTING PNEUMATIC TIRE WITH A PARTIAL INNER LINER

FIELD OF THE INVENTION

The present invention is directed to a self-supporting tire with a modified inner liner. The inner liner of the present invention extends from one shoulder region to the opposing shoulder region of the tire and is located radially inward of the radially innermost layer of the tire.

BACKGROUND OF THE INVENTION

One of the major improvements in tires in the previous century was the development of an inner liner. The presence of the inner liner, extending from bead to bead, radially inward of the tire casing, permitted the elimination of an inner tube. The inner liner is formed of a low permeability material to retain air inside the tire when the tire is properly mounted on a wheel.

Rubbers, such as butyl, bromobutyl, and halobutyl rubber, which are relatively impermeable to air are often used as a major proportion of inner liners. For instance, U.S. Pat. No. 2,676,636 discloses the use of butyl rubber as a highly air-impermeable inner liner for tires. Halobutyl rubbers are frequently employed as inner liners because they offer both excellent gas barrier properties and low temperature flexural properties.

The inner liner is normally prepared by conventional calendering or milling techniques to form a strip of uncured compounded rubber of appropriate width which is sometimes referred to as a gum strip. Typically, the gum strip is the first element of the tire applied to a tire building drum, over and around which the remainder of the tire is built. When the tire is cured, the inner liner becomes an integral, co-cured, part of the tire. Tire inner liners and their methods of preparation are well known to those having skill in such art.

Also known in the tire industry are self-supporting tires, capable of permitting travel even when the tire is underinflated. Such tires are disclosed in U.S. Pat. Nos. 4,365,659, 5,158,627, 5,368,082 and 6,453,961. A common characteristic of a self-supporting tire is the presence of rubber elements in the sidewalls of the tire. The rubber elements prevent collapse of the tire sidewall during underinflation operation.

SUMMARY OF THE INVENTION

The present invention is directed toward a pneumatic tire capable of self-support during under-inflation and which has a modified inner liner construction, capable of providing comparable performance with previous self-supporting tires and having a reduced cost and improved uniformity and improved air retention due to a modified inner liner construction.

Disclosed is a pneumatic radial ply runflat tire. The tire has a tread terminating in a pair of shoulders, a carcass structure comprising at least one radial carcass ply, two bead regions, and two sidewalls. Each sidewall has an upper sidewall portion that connects to the tread shoulders and each sidewall is reinforced by an insert. The insert assists in self-supporting during under-inflated operation. There is also an air impermeable inner liner located radially inward of the carcass structure. In accordance with the invention, radially inward of the carcass ply is an insert liner that extends from one bead region to the opposing bead region. Because of the presence of the insert liner, the air impermeable liner extends only from a location radially inward of one upper sidewall to the opposing upper sidewall.

The insert liner is preferably formed of a substantially similar, if not the same, material as the material forming the sidewall inserts.

In another aspect of the invention, a second insert may be present in each sidewall. The actual design and number of inserts in the tire sidewalls may be of any known design and is dependent upon the performance characteristics of the tire.

In another aspect of the invention, the tire has second and third air impermeable liners, each located in one bead region. The radially outer edge of each second and third air impermeable liners overlaps the ends of the insert liner. In such a construction, air impermeable liners are located in the most critical areas: under the tread and shoulders and around the bead regions.

In another aspect of the invention, to prevent the tire sidewalls from becoming excessively heavy or too thick, the insert liner and the sidewall inserts have a combined maximum thickness in the range of 5 mm to 12 mm. The actual thickness will be determined by the actual tire size.

Definitions

The following definitions are used herein in describing the disclosed invention:

"Axial" and "axially" means the lines or directions that are parallel to the axis of rotation of the tire;

"Bead" means that part of the tire comprising an annular tensile member wrapped by ply cords and shaped, with or without other reinforcement elements such as flippers, chippers, apexes, toe guards and chafers, to fit the design rim;

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire;

"Circumferential" means lines or directions extending along the perimeter of the surface of the annular tread perpendicular to the axial direction;

"Carcass" means the tire structure apart from the belt structure, tread, undertread, and sidewall rubber over the plies, but including the beads;

"Chafers" refers to narrow strips of material placed around the outside of the bead to protect cord plies from the rim, distribute flexing above the rim, and to seal the tire;

"Cord" means one of the reinforcement strands of which the plies in the tire are comprised;

"Equatorial Plane (EP)" means the plane perpendicular to the tire's axis of rotation and passing through the center of its tread;

"Inner liner" means the layer or layers of elastomer or other material that form the inside surface of a tubeless tire and that contain the inflating fluid within the tire;

"Maximum section height" means the greatest radial distance from the nominal rim diameter to the outer diameter of the tire;

"Maximum Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands;

"Normal Inflation Pressure" means the specific design inflation pressure and load assigned by the appropriate standards organization for the service condition for the tire;

"Ply" means a continuous layer of rubber-coated parallel cords;

"Radial" and "radially" mean directions radially toward or away from the axis of rotation of the tire;

"Radial Ply Tire" means a belted or circumferentially-restricted pneumatic tire in which the ply cords which extend from bead to bead are laid at cord angles between 65° and 90° with respect to the equatorial plane of the tire;

"Section Height" means the radial distance from the nominal rim diameter to the outer diameter of the tire at its equatorial plane;

"Shoulder" means the upper portion of sidewall just below the tread edge;

"Sidewall" means that portion of a tire between the tread and the bead;

"Tread Width" means the arc length of the tread surface in the axial direction, that is, in a plane parallel to the axis of rotation of the tire.

BRIEF DESCRIPTION OF THE DRAWINGS

The invention will be described by way of example and with reference to the accompanying drawings in which.

DETAILED DESCRIPTION OF THE INVENTION

Figure 1:
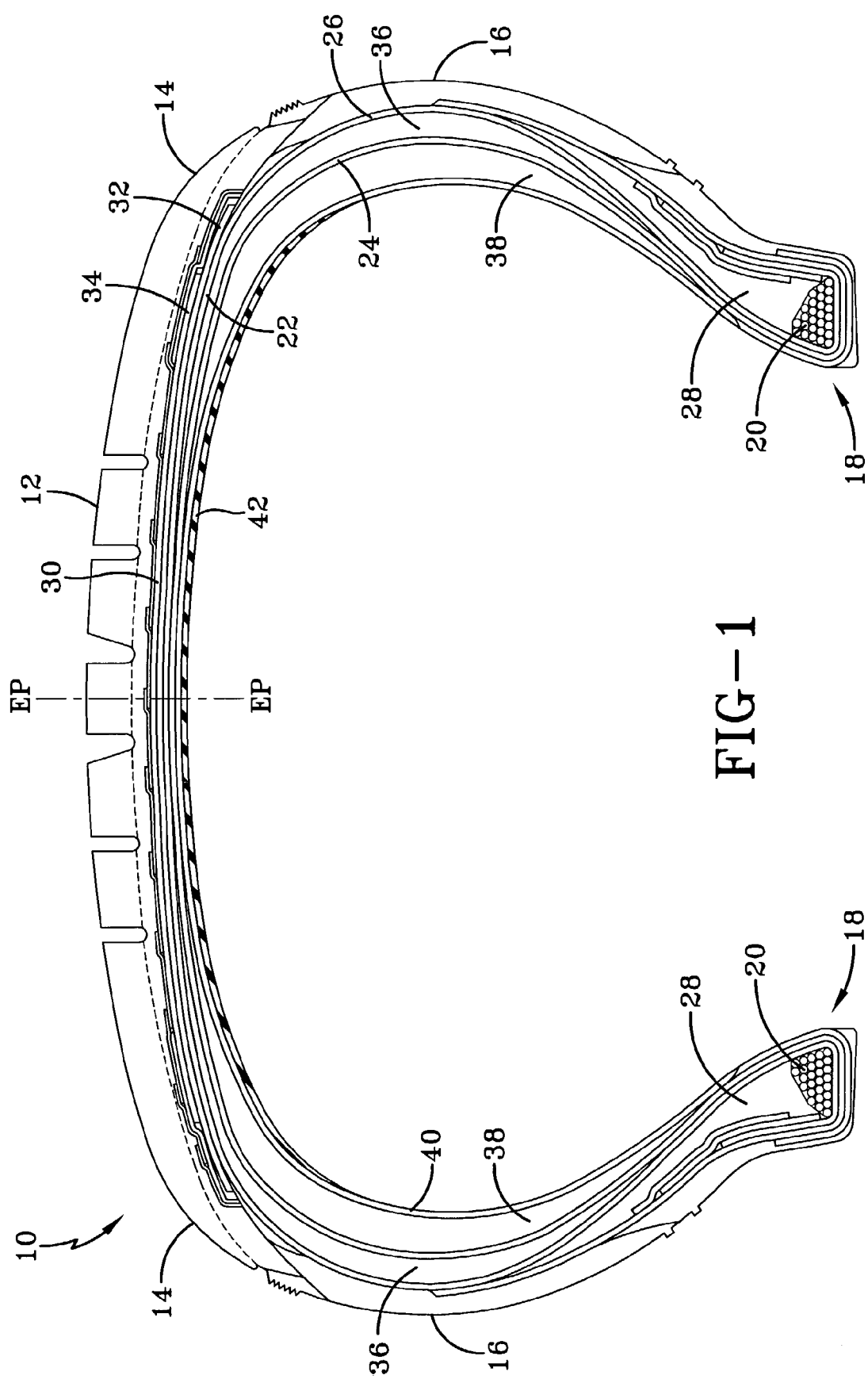
FIG. 1 is a cross-sectional view of a tire in accordance with the invention.

FIG. 1 illustrates a pneumatic radial runflat tire 10. The tire is a passenger tire, but the disclosed construction may be used for tires for other applications. The tire has a ground-engaging tread 12 that terminates in the shoulders 14 at the lateral edges of the tread 12. Sidewalls 16 extend from the shoulders 14 and terminate in a pair of bead portions 18, each bead portion 18 has an annular inextensible bead core 20. The bead cores 20 are preferably constructed of a single or monofilament steel wire continuously wrapped and a suitable bead core construction is described in U.S. Pat. No. 5,263,526. The tire 10 has a carcass reinforcing structure 22 that extends from the first bead portion 18 through the first sidewall 16, tread 12, second sidewall portion 16 to the second bead portion 18.

The carcass reinforcing structure 22 comprises at least one reinforcing ply. In the illustrated embodiment, there is a first radially inner reinforcing ply structure 24, the ends of which are turned up around the bead cores 20, and a radially outer second reinforcing ply structure 26, the ends of which are not turned about the bead cores 20 and is what is called a "floating" ply. Each ply 24, 26 is formed from a single layer of parallel reinforcing cords. The cords of each reinforcing ply structure 24, 26 are oriented at an angle of at least 75 degrees with respect to the mid-circumferential centerplane CP of the tire 10. The cords may be made of any material normally used for cord reinforcement of rubber articles, for example, and not by way of limitation, rayon, nylon, polyester, and steel. Preferably, the cords are made of material having a high adhesion property with rubber and high heat resistance. While this embodiment has only two plies, any number of carcass plies may be used.

Located within the bead portions 18 and the radially inner portions of the sidewalls 16 are high modulus elastomeric apexes 28 disposed between carcass plies 24, 26 and the turnup ends of the first carcass ply 24. The elastomeric apexes 28 extend from the radially outer side of the bead cores 20 and up into the sidewalls 16, gradually decreasing in cross-sectional width. The apexes 28 terminate prior to the maximum section width of the tire 10.

Placed circumferentially about the radially outer surface of the carcass reinforcing structure 22 and beneath the tread 12 is a belt structure 30. In the illustrated tire 10, the belt structure 30 comprises two cut belt plies 32, 34. The cords of the belt plies 32, 34 are oriented at an angle of 17° to 27° with respect to the mid-circumferential centerplane of the tire. The cords of the first belt ply 32 are disposed in an opposite direction to the mid-circumferential centerplane and from that of the cords of the adjacent belt ply 34. However, the belt structure 30 may comprise any number of belt plies of any desired configuration and the cords may be disposed at any desired angle. The belt structure 30 has a lateral stiffness across the belt width so as to minimize lifting of the tread 12 from the road surface during operation of the tire 10 in the uninflated state. In the embodiment illustrated, this is accomplished by making the cords of belt plies 32, 34 of steel and preferably of a steel cable construction.

Located adjacent to the carcass structure 22 in each sidewall 16 is at least one elastomeric insert. In the illustrated tire 10 of FIG. 1, there are two such inserts 36, 38 in each sidewall 16. The first and outer insert 36 is located between the two carcass plies 24, 26 and the second and inner insert 38 is located radially inward of the first carcass ply 24. Each insert 36, 38 extends from at least the upper sidewall portions, with preferably at least one insert 38 extending from under the edge of the belt structure 30 so as to eliminate any hinge points, to the bead portion 18, with at least one insert 36 overlapping the bead apex 28 to eliminate any hinge points in the bead portion of the tire 10. Both of the inserts 36, 38 are characterized by having a high degree of stiffness, yet also have a relatively low hysteresis for such a degree of stiffness. The greatest width of each insert 36, 38 is best determined by the end use of the tire 10, but at a minimum, each insert 36, 38 has a maximum width of at least 1% of the maximum section height of the tire and not greater than 12% of the maximum section height. Whatever maximum widths are selected for the inserts 36, 38, when combined with the apex, the majority of the sidewall 16 is preferably of a constant thickness.

In accordance with the present invention, radially inward of the inner insert 38 is an insert liner 40 extending from one bead portion 18 to the opposing bead portion 18. Preferably, the liner 40 has a constant thickness over its full length, though certain regions may vary in thickness. Most importantly, the insert liner 40 is formed of the same material, or a substantially similar material, as the inner insert 38. The insert liner has a preferred average thickness of 0.8 mm to 1.5 mm.

So that the sidewall thickness is not increased due to the presence of the insert liner 40, the thickness of the inner insert 38 is reduced, so that the maximum total thickness of the insert liner and the inner insert is at least 1% and not greater than 12% of the maximum section height.

Radially inward of the insert liner 40, at least below the tread region of the tire 10, is an air impermeable inner liner 42. Distinct from conventional tires, the impermeable liner 42 does not extend from bead to bead to achieve the desired air retention properties of the tire. The material forming the inner liner 42 may be any material conventionally used for inner liners, including but not limited to butyl, bromobutyl, and halobutyl rubber as well as any material with the air permeability characteristics of butyl, bromobutyl, or halobutyl rubber. The thickness of the impermeable liner is preferably in the range of 0.3 to 1.5 mm.

Figure 2:
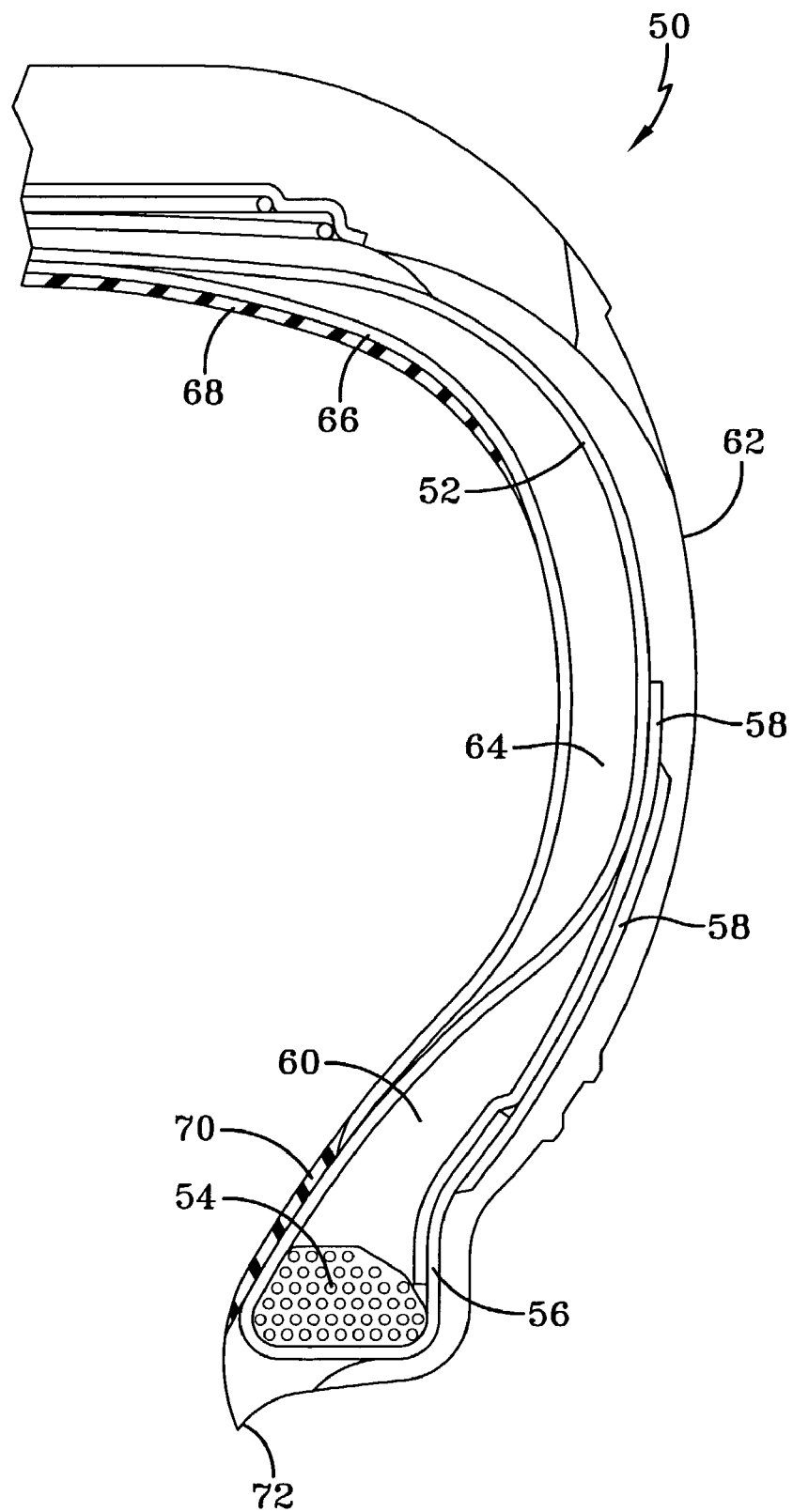
FIGS. 2–4 are cross-sectional views of different tire embodiments.

FIG. 2 illustrates an alternative embodiment of a tire in accordance with the invention, wherein only half the tire 50 is illustrated, the other half of the tire being a mirror image of that illustrated. In this tire 50, the carcass structure is a single ply 52 that wraps about the bead core 54. The carcass turnup end 56 is sandwiched between chippers 58 that extend further up into the tire sidewall, the carcass and the turnup enclosing the apex 60.

Radially inward of the carcass ply 52, in the sidewall region 62, is a insert 64 to provide support to the tire when operating in an underinflated condition. Similar to the tire 10 of the first embodiment, radially inward of the insert 64 is a insert liner 66 that extends from bead to bead. The thickness of the insert 64 is reduced to compensate for the thickness of the insert liner 66. The total maximum thickness of the insert 64 and the insert liner 66 should be in the range of 5 mm to 12 mm, the selection dependant upon the tire size being manufactured.

Radially inward of the insert liner 66 is a split 3-piece inner liner construction. The first piece of the inner liner 68 extends from one shoulder region to the opposing shoulder region, tapering at the ends to blend into the internal structure of the tire 50. The second and third pieces 70 are each located in the bead regions, extending from the just over the end of the insert liner 66 and around each toe 72 of the tire 50.

Figure 3:
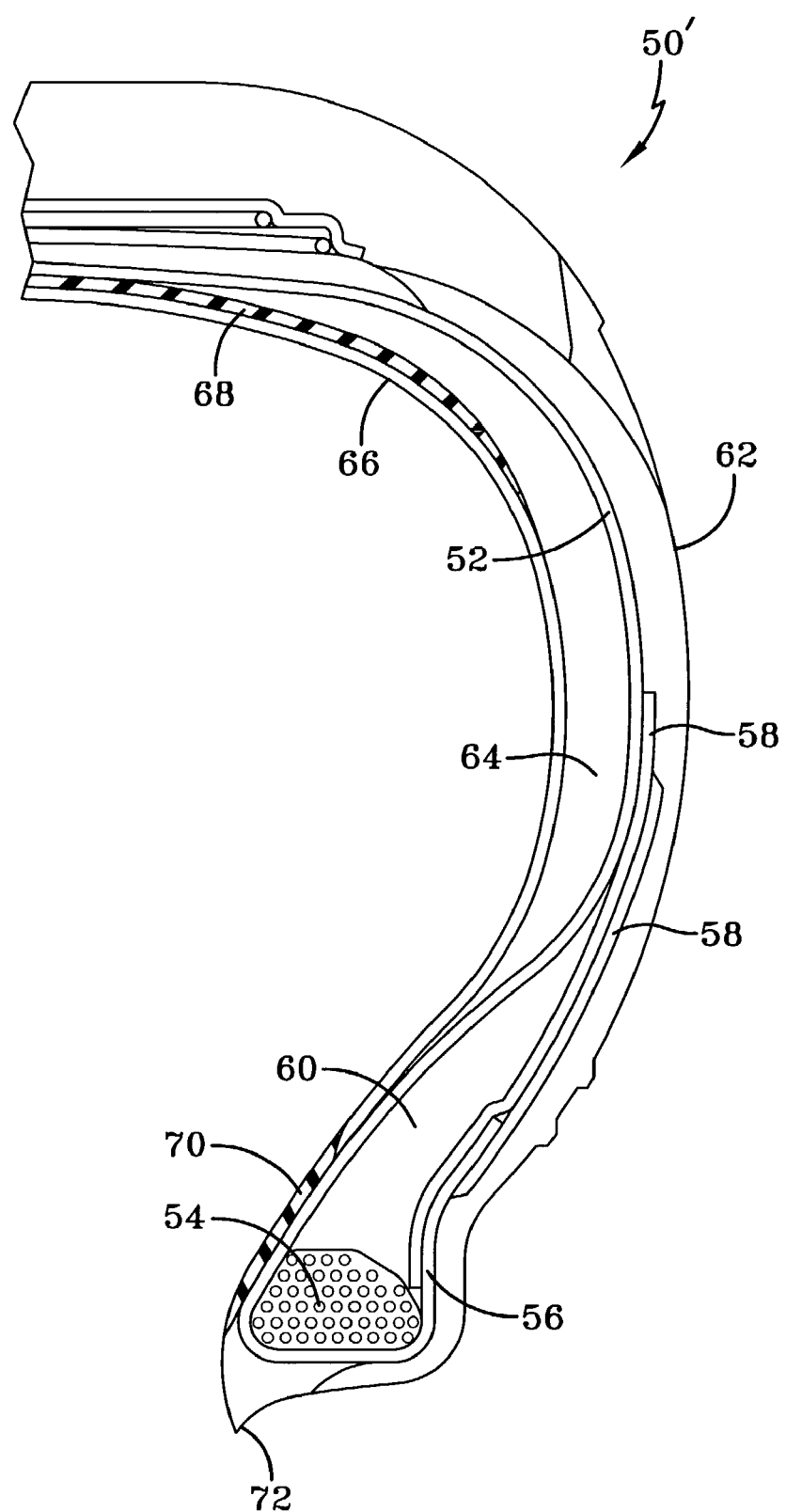
Figure 4:
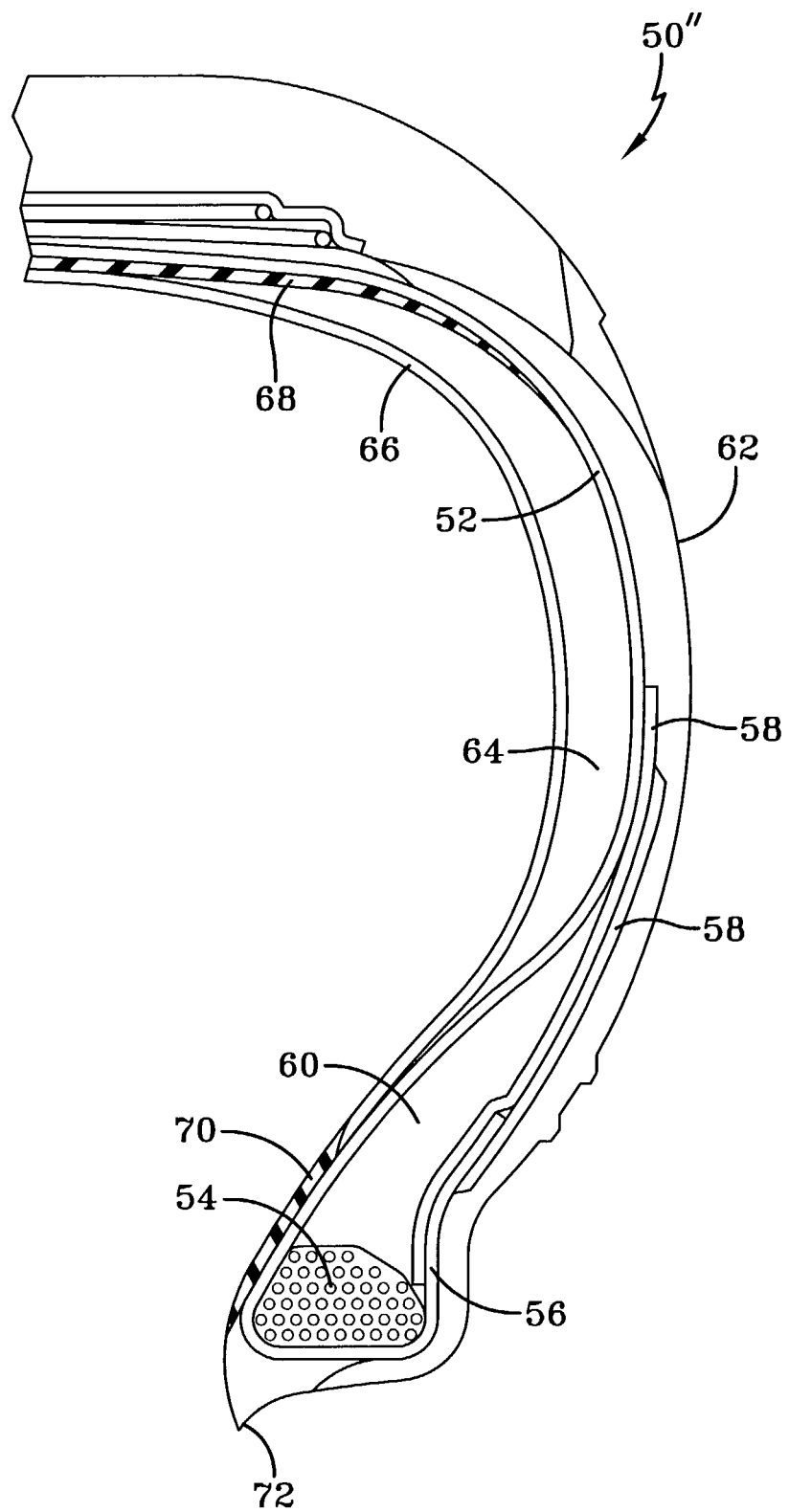

FIGS. 3 and 4 illustrate permissible variations on the invention. In FIG. 3, the shoulder to shoulder inner liner 68 is located radially outward of the insert liner 66. The tire 50' is provided with the second and third pieces 70 in the bead regions; however, such pieces 70 may be excluded, similar to the tire 10 of FIG. 1. In the tire 50" of FIG. 4, the shoulder to shoulder inner liner 68 is moved further outward and is located radially outward of the insert 64, but inward of the carcass ply 52. With either tire 50' or 50", multiple inserts such as the inserts 36, 38 of FIG. 1 may be used and in either construction, the shoulder to shoulder inner liner 68 is radially inward of the innermost carcass ply.

The insert 64 in the second, third and fourth illustrated embodiments is illustrated as being formed of a singular material. However, it is within the scope of this invention to have the singular insert formed of multiple materials, such as that disclosed in U.S. Pat. No. 6,453,961. Other insert configurations, as well as other belt, carcass, bead portion and apex configurations, are within the scope of this invention.

The rationale behind the construction of the modified impermeable inner liner is as follows. During experimentation, it was determined that the nature of the inner liner has a significant impact on the performance of a tire. For a conventional, non-Runflat tire, the liner is the fifth largest contributor, out of eleven tire components, towards rolling resistance characteristics, and is the third heaviest component in the tire. While for a Runflat tire, the liner's contribution is not as great, it is still greater than the majority of other tire components. Because of this factor, the inventors investigated the effect of the inner liner on a Runflat tire.

Tires, as described in Table 1, were built and tested to determine air permeability characteristics of Runflat tires. In addition to the inner liner construction described in the table, each tire had the following common construction features: a single runflat insert in each sidewall, an apex, two steel cord belts, a spiral overlay, a tread, and a single rayon carcass ply.

|  | Construction 1 | Construction 2 | Construction 3 | Construction 4 |
| --- | --- | --- | --- | --- |
| Inner Liner Construction | Shoulder to Shoulder | Bead to Bead | Not present | Shoulder to shoulder + in the toe area |
| Insert Liner Construction | Bead to bead | Not present | Bead to Bead | Bead to bead |
| Accelerated Pressure Loss per month on New tire | 8.05% | 7.05% | 12.18% | 6.81% |
| Rating (higher is better) | 86 | 100 | 27 | 103 |
| Runflat mileage, km, average | 387 | 323 | 400 | 375 |
| Rating (higher is better) | 119 | 100 | 124 | 116 |
| Camber High Speed Test, mins, average | 58 | 53 | 57 | 56 |
| Rating (higher is better) | 109 | 100 | 107 | 105 |

From the accelerated air retention test, the following conclusion were made: a) results are consistent with the air diffusion rates of the compounds used as a liner—the inner liner materials have a greater impermeability rate than the sidewall insert material; and b) the sidewall area has only a small contribution on air retention—concluded from the good performance of the shoulder-to-shoulder inner liner lay-up (with or without the inner liner in the toe area) versus the bead-to-bead inner liner lay-up.

From the camber high speed test, the conclusion was made that the amount of energy dissipated by the inner liner in the insert area affects the high speed performance.

From the runflat durability test, the conclusion was that runflat performance is significantly affected by the amount of energy dissipated by the inner liner in the insert area. As deduced from the table, the best performance is achieved when no inner liner is present in the construction.

Based on these tests, the inventors determined that the inner liner material need not extend the full width of the inner circumference of the tire, but must be present in the tread region from one shoulder to the opposing shoulder. The resulting construction provides the best compromise for air retention, camber high speed, and run flat performance in a self supporting tire. In addition, this type of construction offers cost reduction possibilities because of reduced use of costly impermeable materials. Also the uniformity of the tire construction is improved due to a defined and controllable thickness of the insert liner. Also, when the insert liner 40, 66 is formed from the same or a substantially similar material as the adjacent insert 38, 64, excellent adhesion of the tire components is achieved. Additionally, the weight of the tire is maintained while the run flat performance is improved.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic radial ply runflat tire having a tread terminating in a pair of shoulders, a carcass structure comprising at least one radial carcass ply, two bead regions, two sidewalls, each sidewall having an upper sidewall portion that connects to the shoulders and being reinforced by an insert, a belt structure between the tread and the carcass, and an air impermeable inner liner formed of a butyl rubber located radially inward of the carcass structure wherein:

the insert is located radially inward of the carcass ply,
   radially inward of the insert is an insert liner that extends from one bead region to the opposing bead region, and
   the air impermeable inner liner is radially outward of the insert liner and extends only from a location adjacent and radially inward of one upper sidewall to a location adjacent and radially inward of the opposing upper sidewall.

2. The tire of claim 1 wherein the tire is further comprised of a second insert in each sidewall.

3. The tire of claim 1 wherein the tire is further comprised of second and third air impermeable inner liners, each located in one bead region, wherein the radially outer edge of each second and third air impermeable liners overlaps the ends of the insert liner.

4. The tire of claim 1 wherein the insert liner and the insert have a combined maximum thickness in the range of 5 mm to 12 mm.

5. The tire of claim 1 wherein the butyl rubber of the air impermeable liner is a halobutyl or a bromobutyl rubber.

6. The tire of claim 1 wherein the insert liner has a thickness in the range of 0.5 to 1.5 mm.

7. The tire of claim 1 wherein the inner liner has a thickness in the range of 0.3 to 1.5 mm.

8. The tire of claim 1 wherein the insert liner is formed of the same material as the material forming the insert.

* * * * *